US008275423B2

(12) United States Patent
Matson et al.

(10) Patent No.: US 8,275,423 B2
(45) Date of Patent: *Sep. 25, 2012

(54) MAC CONTROLLED SLEEP MODE/WAKE-UP MODE WITH STAGED WAKE-UP FOR POWER MANAGEMENT DEVICES

(75) Inventors: Mark D. Matson, Acton, MA (US); Bruce E. Edwards, Belmont, MA (US)

(73) Assignee: Broadcom Corporation, Irvine, CA (US)

(*) Notice: Subject to any disclaimer, the term of this patent is extended or adjusted under 35 U.S.C. 154(b) by 574 days.

This patent is subject to a terminal disclaimer.

(21) Appl. No.: 12/537,495

(22) Filed: Aug. 7, 2009

(65) Prior Publication Data

US 2009/0298555 A1  Dec. 3, 2009

Related U.S. Application Data

(63) Continuation of application No. 10/810,094, filed on Mar. 26, 2004, now Pat. No. 7,583,985.

(51) Int. Cl.
*H04M 1/00* (2006.01)
*H04B 1/38* (2006.01)
*H04B 1/16* (2006.01)
*H04B 1/04* (2006.01)
*H01Q 11/12* (2006.01)

(52) U.S. Cl. .................. 455/574; 455/127.5; 455/343.5

(58) Field of Classification Search .................. 455/574, 455/572, 127.5, 343.1, 343.5
See application file for complete search history.

(56) References Cited

U.S. PATENT DOCUMENTS 6,473,607 B1* 10/2002 Shohara et al. ............ 455/343.1
6,622,251 B1*  9/2003 Lindskog et al. ............ 713/300
2004/0227763 A1* 11/2004 Wichman et al. ............ 345/503

* cited by examiner

*Primary Examiner* — Andrew Wendell
(74) *Attorney, Agent, or Firm* — Garlick & Markison (57) ABSTRACT

A power management scheme for a wireless communications device processor substantially implemented on a single CMOS integrated circuit is described. By incorporating controls for sleep and wake-up mode transitions in the processor's control logic, improved power savings with reduced latency is provided, obviating the need for hardware-focused solutions with elaborate signaling mechanisms. A fully integrated power management with staged wake-up operations controlled by the MAC solution consumes less power than the conventional wireless LAN solutions in standby mode.

20 Claims, 5 Drawing Sheets

MAC CONTROLLED SLEEP MODE/WAKE-UP MODE WITH STAGED WAKE-UP FOR POWER MANAGEMENT DEVICES

CROSS REFERENCE TO RELATED APPLICATION

This application is a continuation of and claims priority pursuant to 35 U.S.C. §120 to U.S. patent application having an application Ser. No. 10/810,094, filed Mar. 26, 2004, which application is incorporated herein by reference in its entirety.

BACKGROUND OF THE INVENTION

1. Field of the Invention

The present invention relates in general to the field of data processing. In one aspect, the present invention relates to a method and system for reducing power consumption in a communications system.

2. Related Art

In general, data processors are capable of executing a variety of instructions. Processors are used in a variety of applications, including communication systems formed with wireless and/or wire-lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital amps, global system for mobile communications (GSM), code division multiple access (CDMA), local multi-point distribution systems (LMDS), multi-channel-multi-point distribution systems (MMDS) and/or variations thereof.

Especially with wireless and/or mobile communication devices (such as a cellular telephone, two-way radio, personal digital assistant (PDA), personal computer (PC), laptop computer, home entertainment equipment, etc.), the processor or processors in a device must be able to run various complex communication programs using only a limited amount of power that is provided by power supplies, such as batteries, contained within such devices. In particular, for a wireless communication device to participate in wireless communications, the device includes a built-in radio transceiver (i.e., receiver and transmitter) or is coupled to an associated radio transceiver (e.g., a station for in-home and/or in-building wireless communication networks, RF modem, etc.).

To implement the transceiver function, one or more processors and other modules are used to form a transmitter which typically includes a data modulation stage, one or more intermediate frequency stages and a power amplifier. The data modulation stage converts raw data into baseband signals in accordance with a particular wireless communication standard. The intermediate frequency stages mix the baseband signals with one or more local oscillations to produce RF signals. Alternatively, in direct conversion transmitters/receivers, conversion directly between baseband signals and RF signals is performed. The power amplifier amplifies the RF signals prior to transmission via an antenna. In addition, one or more processors and other modules are used to form a receiver which is typically coupled to an antenna and includes a low noise amplifier, one or more intermediate frequency stages, a filtering stage and a data recovery stage. The low noise amplifier receives inbound RF signals via the antenna and amplifies them. The intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

Because of the computational intensity (and the associated power consumption by the processor(s)) for such transceiver functions, it is an important goal in the design of wireless and/or mobile communication devices to minimize processor and other module operations (and the associated power consumption). It is particularly crucial for mobile applications in order to extend battery life. The device must provide a high rate of data throughput when necessary, and otherwise enter a low power mode, called a sleep mode, where various modules are deactivated. Such a strategy can greatly decrease the system's average power consumption. With conventional solutions for saving power, a variety of complex circuit and hardware designs have been proposed. These mechanisms exhibit substantial latencies for entering and leaving sleep mode, which restricts the power that can be saved and the range of applicability because these latencies may preclude a processor from being able to deactivate modules before having to reactivate them. Moreover, these mechanisms are burdensome to use, requiring code routines such as an interrupt handler to evaluate and respond to the wake-up conditions. In addition, many implementations are based on complex signaling mechanisms and processor state transitions which require significant hardware and software support and also exhibit long latencies.

In addition to the complexity of the computational requirements for a communications transceiver, such as described above, the ever-increasing need for higher speed communications systems imposes additional performance requirements and resulting costs for communications systems. In order to reduce costs, communications systems are increasingly implemented using Very Large Scale Integration (VLSI) techniques. The level of integration of communications systems is constantly increasing to take advantage of advances in integrated circuit manufacturing technology and the resulting cost reductions. This means that communications systems of higher and higher complexity are being implemented in a smaller and smaller number of integrated circuits. For reasons of cost and density of integration, the preferred technology is CMOS. To this end, digital signal processing ("DSP") techniques generally allow higher levels of complexity and easier scaling to finer geometry technologies than analog techniques, as well as superior testability and manufacturability.

Therefore, a need exists for a method and apparatus that provides reduced power consumption with smaller deactivation and/or activation latencies. In addition, a need exists for reducing processor power consumption without requiring complex hardware and elaborate signaling mechanisms. Moreover, a need exists for improved selectivity when determining the nature and extent of the required power-up operations. There is also a need for a better system that is capable of performing the above functions and overcoming these difficulties without increasing circuit area and operational power. Further limitations and disadvantages of conventional systems will become apparent to one of skill in the art after reviewing the remainder of the present application with reference to the drawings and detailed description which follow.

SUMMARY OF THE INVENTION

The present invention is directed to apparatus and methods of operation that are further described in the following Brief Description of the Drawings, the Detailed Description of the Invention, and the Claims. Other features and advantages of the present invention will become apparent from the following detailed description of the embodiments of the invention made with reference to the accompanying claims and drawings.

DETAILED DESCRIPTION

A method and apparatus for an improved communications processor is described. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Broadly speaking, the present invention provides an improved method and system for controlling the sleep and wake-up modes of a processor. Using a PSM (programmable state machine) in the MAC layer of a communications processor, the processor and associated modules may be quickly powered down and efficiently reactivated by powering up only the processor and the required modules necessary to respond to the asserted wake-up conditions. This may be accomplished by issuing a wake-up signal only when specified wake-up conditions are detected, and then only reactivating the necessary components to respond to the wake-up signal. With this approach, a staged wake-up is provided for improved power management with reduced latencies.

In accordance with various embodiments of the present invention, a method and apparatus provides a power saving mechanism for a programmable communications processor. The power saving mechanism may be implemented using the MAC layer programming to control the sleep and wake-up modes and to provide for a staged wake-up of various processor modules for improved power management. The host processor may also be subject to this power management. The PSM invokes the power saving mechanism by specifying wake-up conditions and a sleep time-out period, and then executing a sleep instruction until a wake-up condition is detected or the time-out period expires, at which time the wake-up condition is processed to determine what specific circuitry or modules need to be reactivated. In a selected embodiment power control logic is provided for directly awakening some modules, while other modules are awakened by the PSM's instruction once the PSM reawakens. Thus, the present invention provides improved effectiveness, reduced latency, simplified programming and reduced hardware overhead.

Figure 1:
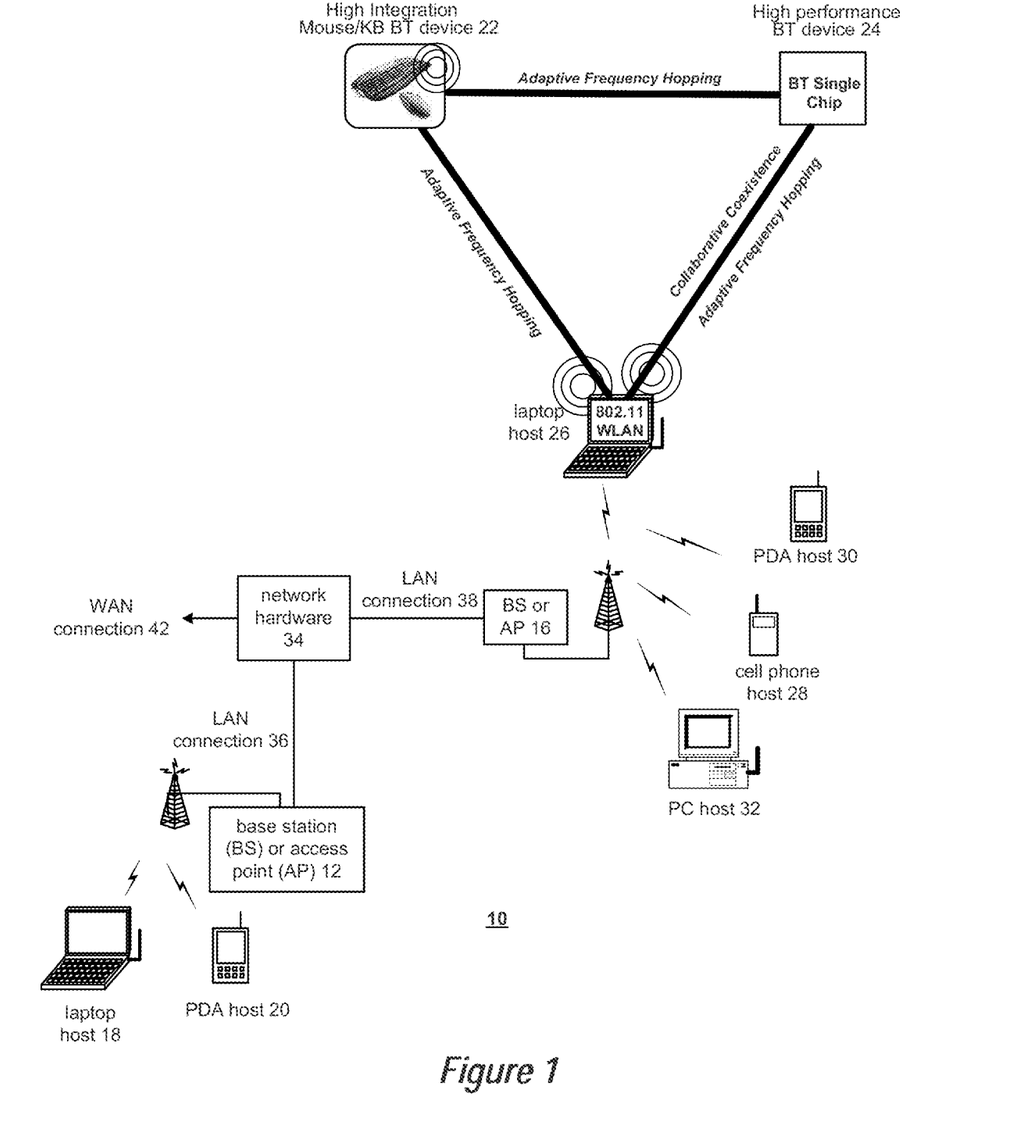
FIG. 1 is a schematic block diagram of a wireless communication system in accordance with an exemplary embodiment of the present invention.

FIG. 1 illustrates a wireless communication system 10 in which embodiments of the present invention may operate. As illustrated, the wireless communication system 10 includes a plurality of base stations and/or access points 12, 16, a plurality of wireless communication devices 18-32 and a network hardware component 34. The wireless communication devices 18-32 may be laptop host computers 18, 26, personal digital assistant hosts 20, 30, personal computer hosts 32, cellular telephone hosts 28 and/or wireless keyboards, mouse devices or other Bluetooth devices 22, 24. The details of the wireless communication devices will be described in greater detail with reference to FIGS. 2-5.

As illustrated, the base stations or access points 12, 16 are operably coupled to the network hardware 34 via local area network connections 36, 38. The network hardware 34 (which may be a router, switch, bridge, modem, system controller, etc.) provides a wide area network connection 42 for the communication system 10. Each of the base stations or access points 12, 16 has an associated antenna or antenna array to communicate with the wireless communication devices in its area. Typically, the wireless communication devices register with a particular base station or access point 12, 16 to receive services from the communication system 10. For direct connections (e.g., point-to-point communications between laptop 26 and mouse or keyboard 22), wireless communication devices communicate directly via an allocated channel.

Regardless of the particular type of communication system, each wireless communication device includes a built-in radio and/or is coupled to a radio. The radio includes a highly linear amplifier and/or programmable multi-stage amplifier with a low latency power saving mechanism as disclosed herein to enhance performance, reduce costs, reduce size, reduce power consumption and/or enhance broadband applications.

Figure 2:
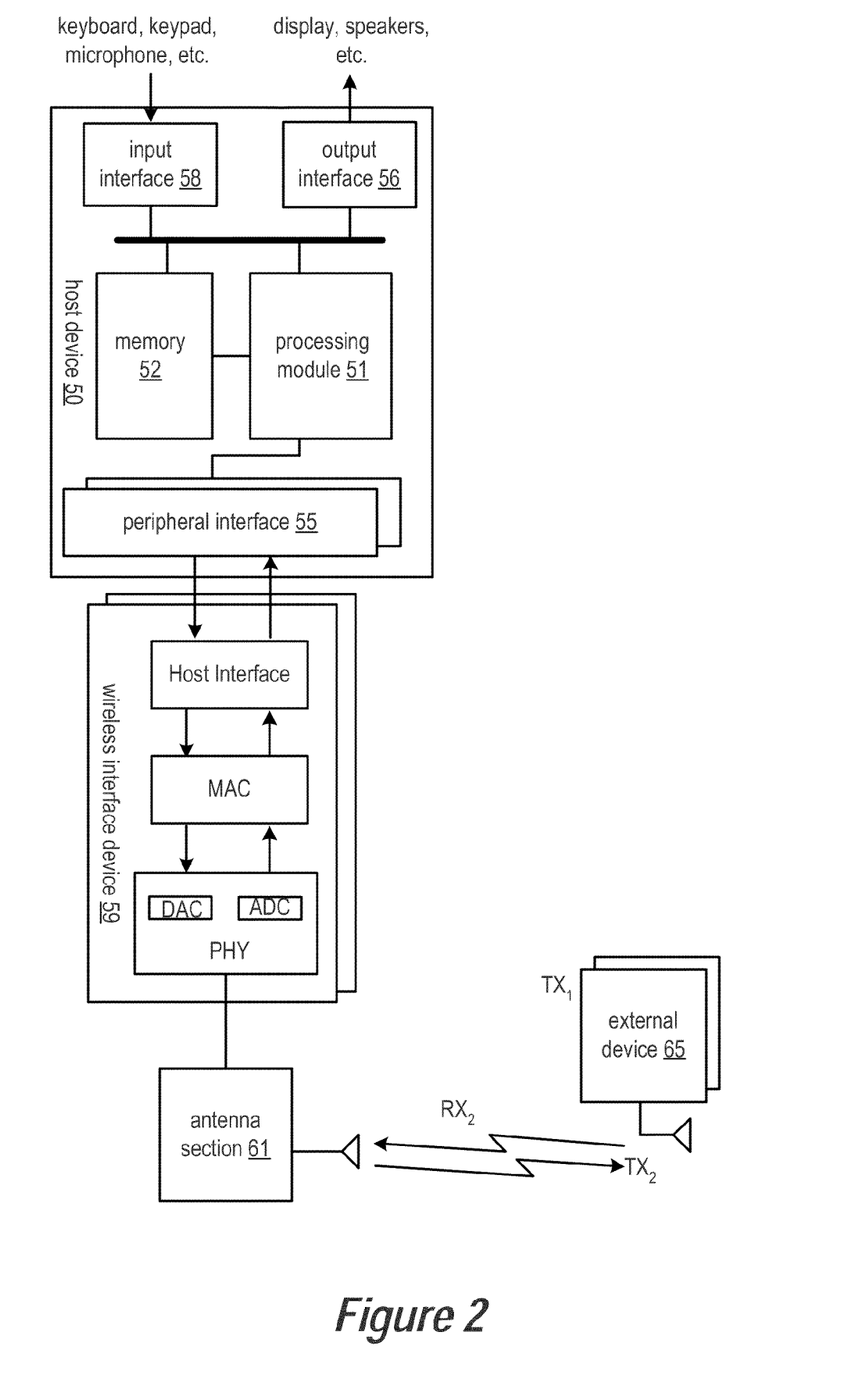
FIG. 2 is a schematic block diagram of a wireless communication device in accordance with an exemplary embodiment of the present invention.

FIG. 2 is a schematic block diagram illustrating a radio implemented in a wireless communication device that includes the host device or module 50 and at least one wireless interface device, or radio transceiver 59. The wireless interface device may be built in components of the host device 50 or externally coupled components. As illustrated, the host device 50 includes a processing module 51, memory 52, peripheral interface 55, input interface 58 and output interface 56. The processing module 51 and memory 52 execute the corresponding instructions that are typically done by the host device. For example, in a cellular telephone device, the processing module 51 performs the corresponding communication functions in accordance with a particular cellular telephone standard.

The wireless interface device 59 includes a host interface, a media-specific access control protocol (MAC) layer module, a physical layer module (PHY), a digital-to-analog converter (DAC), and an analog to digital converter (ADC). The peripheral interface 55 allows data to be received from and sent to one or more external devices 65 via the wireless interface device 59. As will be appreciated, the modules in the wireless interface device are implemented with a communications processor and an associated memory for storing and executing instructions that control the access to the physical transmission medium in the wireless network.

Each external device includes its own wireless interface device for communicating with the wireless interface device of the host device. For example, the host device may be personal or laptop computer and the external device 65 may be a headset, personal digital assistant, cellular telephone, printer, fax machine, joystick, keyboard, desktop telephone, or access point of a wireless local area network. In this example, external device 65 is an IEEE 802.11 wireless interface device.

Figure 3:
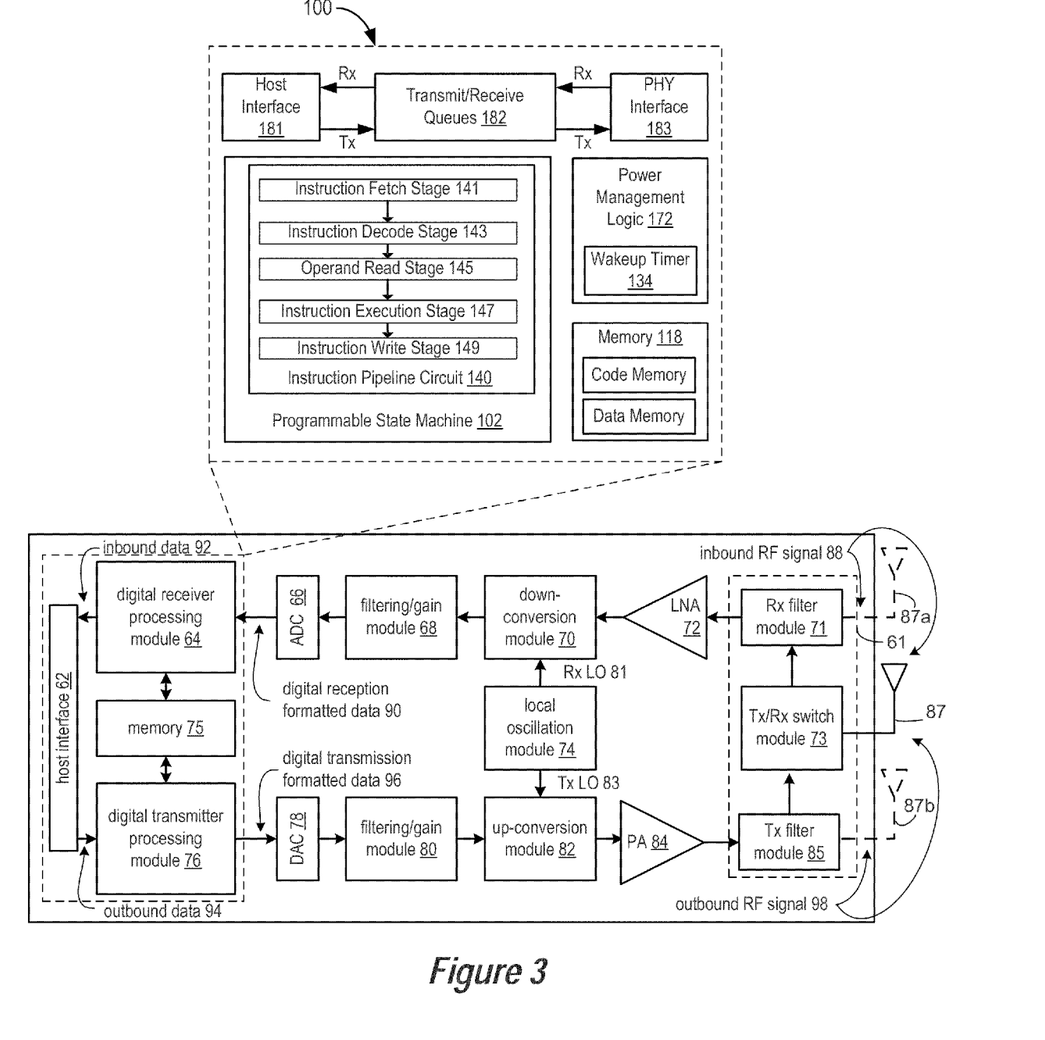
FIG. 3 is a schematic block diagram of a wireless interface device in accordance with an exemplary embodiment of the present invention.

FIG. 3 is a schematic block diagram of a wireless interface device (i.e., a radio) 60 which includes a host interface 62, digital receiver processing module 64, an analog-to-digital converter (ADC) 66, a filtering/gain module 68, a down-conversion stage 70, a receiver filter 71, a low noise amplifier 72, a transmitter/receiver switch 73, a local oscillation module 74, memory 75, a digital transmitter processing module 76, a digital-to-analog converter (DAC) 78, a filtering/gain module 80, a mixing up-conversion stage 82, a power amplifier 84, and a transmitter filter module 85. The transmitter/receiver switch 73 is coupled to the antenna 87, which may include two antennas coupled through a switch. Still further, the antenna section 61 may include separate multiple antennas 87a, 87b for the transmit path and the receive path of each wireless interface device (as shown in FIG. 3). As will be appreciated, the antenna(s) may be polarized, directional, and be physically separated to provide a minimal amount of interference.

The digital receiver processing module 64, the digital transmitter processing module 76 and the memory 75 may execute digital receiver functions and digital transmitter functions in accordance with a particular wireless communication standard. The digital receiver functions include, but are not limited to, digital frequency conversion, demodulation, constellation demapping, decoding and/or descrambling. The digital transmitter functions include, but are not limited to, scrambling, encoding, constellation mapping, modulation and/or digital frequency conversion. The digital receiver and transmitter processing modules 64, 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64, 76 implements one or more of its functions via a state machine, analog circuitry, digital circuitry and/or logic circuitry, the memory storing the corresponding operational instructions may be embedded with the circuitry comprising the state machine, analog circuitry, digital circuitry and/or logic circuitry.

In operation, the wireless interface device 60 receives outbound data 94 from the host device via the host interface 62. The host interface 62 routes the outbound data 94 to the digital transmitter processing module 76, which processes the outbound data 94 to produce digital transmission formatted data 96 in accordance with a particular wireless communication standard, such as IEEE 802.11 (including all current and future subsections), Bluetooth, etc. The digital transmission formatted data 96 will be a digital base-band signal or a digital low IF signal, where the low IF typically will be in the frequency range of one hundred kilohertz to a few megahertz. Subsequent stages convert the digital transmission formatted data to an RF signal, and may be implemented as follows. The digital-to-analog converter 78 converts the digital transmission formatted data 96 from the digital domain to the analog domain. The filtering/gain module 80 filters and/or adjusts the gain of the analog signal prior to providing it to the up-conversion module 82. The mixing stage 82 directly converts the analog baseband or low IF signal into an RF signal based on a transmitter local oscillation clock 83 provided by local oscillation module 74. The power amplifier 84 amplifies the RF signal to produce outbound RF signal 98, which is filtered by the transmitter filter module 85. The antenna section 61 transmits the outbound RF signal 98 to a targeted device such as a base station, an access point and/or another wireless communication device.

The wireless interface device 60 also receives an inbound RF signal 88 via the antenna section 61, which was transmitted by a base station, an access point, or another wireless communication device. The inbound RF signal is converted into digital reception formatted data; this conversion may be implemented as follows. The antenna section 61 provides the inbound RF signal 88 to the receiver filter module 71 via the transmit/receive switch 73, where the receiver filter 71 band-pass filters the inbound RF signal 88. The receiver filter 71 provides the filtered RF signal to low noise amplifier 72, which amplifies the signal 88 to produce an amplified inbound RF signal. The low noise amplifier 72 provides the amplified inbound RF signal to the mixing module 70, which directly converts the amplified inbound RF signal into an inbound low IF signal or baseband signal based on a receiver local oscillation clock 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal. The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by wireless interface device. The host interface 62 provides the recaptured inbound data 92 to the host device (e.g., 50) via the peripheral interface (e.g., 55).

As will be appreciated, the wireless communication device of FIG. 2 described herein may be implemented using one or more integrated circuits. For example, the host device 50 may be implemented on one integrated circuit, the digital receiver processing module 64, the digital transmitter processing module 76 and memory 75 may be implemented on a second integrated circuit, and the remaining components of the wireless interface device 60 and/or antenna 61, may be implemented on a third integrated circuit. As an alternate example, the wireless interface device 60 may be implemented on a single integrated circuit. As yet another example, the processing module 51 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 51 and the digital receiver and transmitter processing module 64 and 76. In a selected embodiment, the present invention shows, for the first time, a fully integrated, single chip 802.11b/g solution with built-in power management that reduces power consumption using an intelligent stand-by mode to provide greatly extended battery life for mobile devices, all implemented in CMOS (Complementary Metal Oxide Semiconductor), as part of a single chip or multi-chip transceiver radio.

As for the processor componentry of the wireless interface device or radio, an exemplary depiction of the processor details is illustrated in FIG. 3 as communication processor 100, which shows a system level description of the operation of an embodiment of a communication processor embodiment of the present invention. The communication processor 100 may be an integrated circuit or it may be constructed from discrete components. The communication processor 100 may implement a MAC module using a programmable state machine 102 (which includes the Fetch 141, Decode 143, Read 145, Execute 147 and Write 149 pipeline, in that order). The processor 100 also includes a memory 118, which may be implemented as a data RAM memory and code EPROM memory. Also included in the processor are the transmit/receive queues and supporting hardware 182 (coupled between host interface 181 and PHY interface 183), which may include transmit and receive queues, encryption modules, transmit and receive engines and/or packet processing hardware. For power management of the processor 100, power-management logic 172 is provided, including the wake-up timer 134, logic to select wake-up conditions, and logic to direct modules to deactivate themselves.

To reduce the power consumed by processor-related circuits, the present invention provides a power management scheme to extend the battery life of Wi-Fi enabled small mobile devices. In a selected embodiment, the power management scheme uses a software approach to place the transceiver in standby mode and to selectively respond to wake-up commands, thereby reducing power consumption significantly without imposing a performance cost. In mobile device applications, the communications processor is able to spend a majority of its time in standby mode, adding several days of battery life to a PDA.

In a selected embodiment illustrated in FIG. 3, power management may be implemented using a wake-up timer 134 and a one or more specified wake-up conditions. The processor 100 may include instruction decode logic and branch condition logic that is configured to detect a sleep instruction and to respond to the wake-up conditions or the timer 134. Once the communications processor 100 completes a high throughput task and/or receives a sleep instruction, the processor 100 prepares to enter sleep mode by specifying a set of conditions that will re-awaken it. The processor 100 then deactivates as many modules as possible. Some deactivations may occur prior to executing the sleep instruction. Once the sleep instruction has entered the instruction pipeline 140 and the preceding instructions in the pipeline have been completed, the remaining nonessential modules (such as the transmit/receive queues and major portions of the programmable state machine, etc.) are powered-down by either freezing their clocks or placing them in an idle mode. When one of the specified conditions is detected, the processor wakes up, analyzes the condition, and reactivates whatever modules are needed to service the condition.

Figure 4:
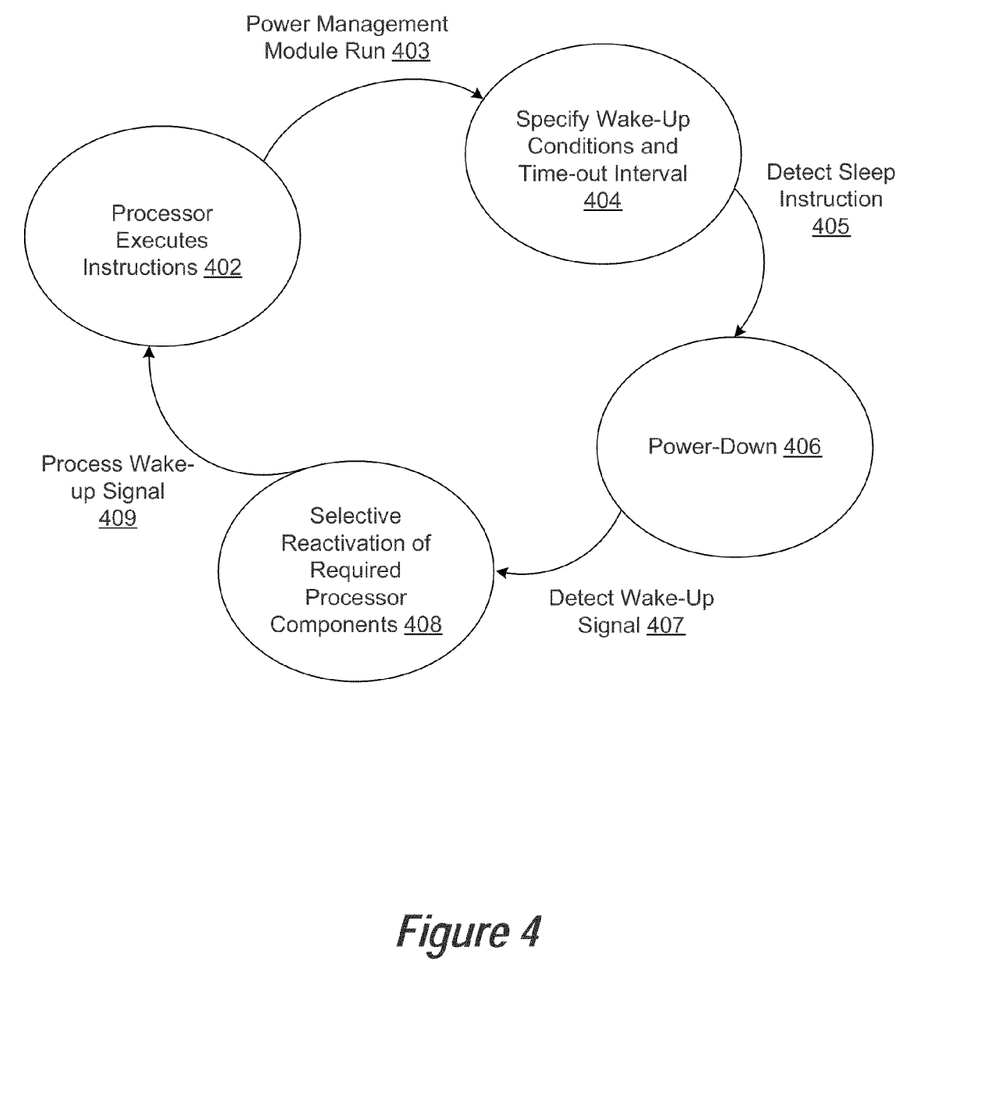
FIG. 4 depicts an exemplary state machine description of an exemplary embodiment of the present invention.

As illustrated in FIG. 4, the sleep and wake-up modes described herein may be controlled by a programmable state machine (PSM) in the MAC layer of a communications processor, whereby the processor and associated modules may be quickly powered down and efficiently reactivated by powering up only the processor and those modules needed to respond to a communications or host related event. In particular, a processor that is fully or partially active and executing instructions (state 402) executes a power management program (transition 403) which specifies the wake-up conditions to which it will respond, along with a time-out period, any one of which will be used to generate a wake-up signal (state 404). The processor subsequently receives a sleep instruction (transition 405) and changes to a power down state 406. In the power down state 406, the processor and some associated modules are also placed in a sleep mode by disabling power and/or clock signals to the processor modules or otherwise idling the modules. Upon receipt of a wake-up signal (transition 407), a selective reactivation state is entered (state 408), whereby the required processor componentry and/or modules are powered-up based upon the detected wake-up condition. The processor then begins processing the wake-up signal and its associated wake-up condition(s) to proceed (via transition 409) to the fully or partially active instruction execution state (state 402), where the required modules are used to execute the instruction(s) corresponding to the detected wake-up condition. In a selected embodiment, when the PSM wakes up, all of the instruction pipeline stages also wake up to permit the instruction to flow from stage to stage, progressing through fetch/decode, read, execute, and write.

Figure 5:
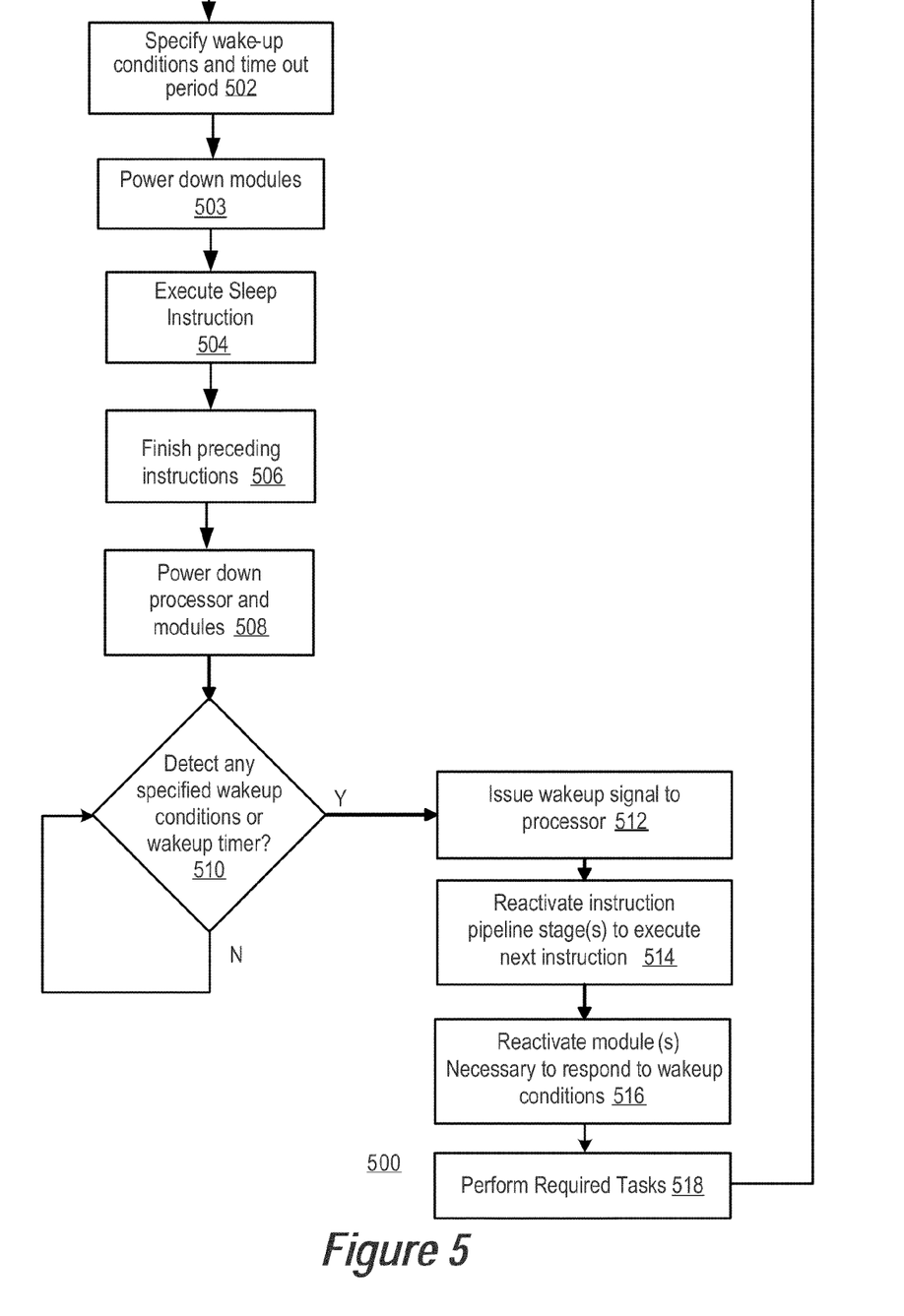
FIG. 5 depicts a methodology and program sequence for an exemplary embodiment of the present invention.

FIG. 5 depicts an exemplary power saving methodology and program sequence for the present invention. As an initial step, after having completed any previous communication tasks, the processor 100 specifies the wake-up conditions that will be used to wake up the processor, along with a time-out period, at step 502. For example, the conditions to observe and the wake-up interval may be specified by registers which are loaded by a power saving program. The processor may then deactivate certain nonessential modules, at step 503. In a selected embodiment, these modules are those whose deactivation is controlled by the processor's instructions. With step 503, the PSM's instructions power down some modules (generally by writing appropriate values into the modules' control registers) prior to the PSM's execution of the sleep instruction.

The processor detects and executes a sleep instruction at step 504. This sleep instruction detection functionality may be implemented by control logic in the processor 100. In one implementation, the instruction decode logic in the processor 100 may be extended to detect the sleep instruction (step 504). Upon receipt of a sleep instruction, the processor logic determines that preceding instructions in the pipeline 140 have completed (step 506) prior to deactivation.

Upon completion of the pending instructions from the pipeline, the processor and its associated modules enter a sleep or standby mode at step 508. In a selected embodiment, if a sleep instruction is encountered (decision 504) when the specified wake-up conditions are de-asserted, the control logic will cease fetching new instructions, wait until any preceding instructions are finished (step 506), and then cause the processor to enter a dormant, low-power state (step 508). The low-power state may be implemented by disabling the clocks for one or more processor modules. In a selected embodiment, these modules are those whose deactivation is directly controlled by the processor's hardware. For any processor modules which require clocks in order to provide data for external devices, these modules may be directed to enter an idle mode.

Once the processor is powered down or in standby mode, when one of the specified conditions occurs or if the wake-up interval is reached (detection step 510), the wake-up signal asserts. In a selected implementation, branch condition logic in the processor may be expanded to select multiple conditions and logically OR them together—along with the wake-up timer's output—to form a wake-up signal.

At step 512, the wake-up signal is issued to the processor. In a selected embodiment, the wake-up signal is supplied to the control logic which reactivates instruction pipeline 140 to begin fetching the next instruction after the sleep instruction (step 514). Subsequent stages of the pipeline are reactivated as this instruction and those that follow are processed.

At step 516, the instructions following the sleep instruction are executed by processor 100 to analyze the asserted wake-up conditions and reactivate the modules that are needed to respond to the wake-up condition (step 518). Rather than reactivating the entire processor and associated modules, the present invention allows for judicious use of power upon wake-up by reactivating only the modules that are needed to service the wake-up condition. Upon completing the required communications tasks, the processor may then specify another set of wake-up conditions and a time-out interval, prior to executing an associated sleep instruction. Optionally, the processor may loop back and repeat some or all of the outlined procedure using the specified wake-up conditions and time-out interval.

With the power saving mechanism of the present invention, the deactivation and re-activation latencies may be reduced significantly as compared to conventional hardware-based techniques involving an interrupt handler to facilitate these tasks. Such conventional techniques require elaborate signaling mechanisms and processor state transitions that impose long latencies. Such latencies greatly restrict the amount of power that can be saved as well as the range of situations where modules can be powered-down. In contrast, an implementation of the present invention relies on a sleep instruction along with logic to decode it and respond appropriately, including selection of wake-up signals and a time-out interval, which quickly and efficiently enables selective reactivation of only the processor modules that are required to service the specified wake-up condition, thereby applying only power that is needed to service the wake-up conditions.

In particular, effective power saving is obtained by deactivating all instruction pipeline stages (instruction fetch, instruction decode and operand read, execution, and write) and other external modules, and then selectively reactivating only the modules needed to service the wake-up condition. A power saving program embodiment provides low latency standby mode to reduce power consumption with minimum delay, and allows its application to a wide range of situations, including those where high throughput and idle intervals alternate in close proximity. From the programmer's perspective, the power saving mechanism of the present invention is simple to use, requiring specification of wake-up conditions and a wake-up interval and then a single sleep instruction. Little additional program memory is needed for these instructions. From a hardware perspective, the overhead is relatively low with only minor extensions being needed with regard to the instruction decode and branch condition logic, as well as the addition of a count-down timer.

As described herein and claimed below, a method and apparatus are provided for controlling the sleep and wake-up modes of a processor. Using a PSM (programmable state machine) in the MAC layer of a communications processor, the processor and associated modules may be quickly powered down and efficiently reactivated by powering up only the processor and those modules needed to respond to a communications event. This translates to a very power efficient processor.

As will be appreciated, the present invention may be implemented in a computer accessible medium including one or more data structures representative of the circuitry included in the system described herein. Generally speaking, a computer accessible medium may include storage media such as magnetic or optical media, e.g., disk, CD-ROM, or DVD-ROM, volatile or non-volatile memory media such as RAM (e.g., SDRAM, RDRAM, SRAM, etc.), ROM, PROM, EPROM, EEPROM, etc. For example, data structure(s) of the circuitry on the computer accessible medium may be read by a program and used, directly or indirectly, to implement the hardware comprising the circuitry described herein. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium may be the netlist(s) (with or without the synthesis library) or the data set(s), as desired. In yet another alternative, the data structures may comprise the output of a schematic program, or netlist(s) or data set(s) derived therefrom. While a computer accessible medium may include a representation of the present invention, other embodiments may include a representation of any portion of the power management system and/or the PSM, memory, supporting hardware modules and power-down logic.

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. An apparatus comprising:
a processor for a wireless communication device that includes an instruction pipeline; and
a power control logic to detect a sleep instruction and to place the processor in a low-power state after completing any preceding instruction or instructions still in the instruction pipeline, and in which the power control logic is operable in response to a wake-up signal to reactivate the instruction pipeline to process a subsequent instruction following the sleep instruction to perform processing tasks associated with the wake-up signal.

2. The apparatus of claim 1, wherein the instruction pipeline comprises a programmable state machine.

3. The apparatus of claim 1, wherein the wake-up signal is generated from a logical OR'ing of multiple wake-up conditions.

4. The apparatus of claim 1, wherein the wake-up signal is generated from a logical OR'ing of multiple wake-up conditions and a time-out interval.

5. The apparatus of claim 4, wherein the wake-up conditions and the time-out interval are stored in a register.

6. The apparatus of claim 1, wherein the power control logic includes instruction decode logic to detect the sleep instruction.

7. The apparatus of claim 1, wherein the sleep instruction is detected at an instruction decode stage of the instruction pipeline.

8. The apparatus of claim 7, wherein the power control logic instructs the instruction pipeline to cease fetching new instructions after encountering the sleep instruction at the decode stage.

9. The apparatus of claim 1, wherein the processor and the power control logic are utilized as part of a media access control (MAC) layer for the wireless communication device.

10. A method comprising:
detecting a sleep instruction in a power control logic associated with a processor for a wireless communication device, in which the processor includes an instruction pipeline for executing instructions;
stopping fetch of new instructions after encountering the sleep instruction;
completing any preceding instruction or instructions still in the instruction pipeline in response to the sleep instruction;
placing the processor in a low-power state after completing any preceding instruction or instructions still in the instruction pipeline;
reactivating the instruction pipeline to process a subsequent instruction following the sleep instruction in response to a wake-up signal; and
performing processing tasks associated with the subsequent instruction following the sleep instruction in response to the wake-up signal.

11. The method of claim 10, further comprising executing the sleep instruction in the instruction pipeline that comprises a programmable state machine.

12. The method of claim 10, further comprising generating the wake-up signal by a logical OR'ing of multiple wake-up conditions.

13. The method of claim 10, further comprising generating the wake-up signal by a logical OR'ing of multiple wake-up conditions and a time-out interval.

14. The method of claim 13, further comprising storing in a register the wake-up conditions and the time-out interval.

15. The method of claim 10, wherein the detecting the sleep instruction includes using a decode logic to detect the sleep instruction.

16. The method of claim 10, wherein the detecting the sleep instruction is performed at an instruction decode stage of the instruction pipeline.

17. The method of claim 10, wherein the processor and the power control logic are utilized as part of a media access control (MAC) layer for the wireless communication device.

18. A processor for a wireless communication device comprising:
a processing unit for the wireless communication device that includes an instruction pipeline; and
a power control logic to detect a sleep instruction and to place the processing unit in a low-power state after completing any preceding instruction or instructions still in the instruction pipeline, and in which the power control logic is operable in response to a wake-up signal to reactivate the instruction pipeline to process a subsequent instruction following the sleep instruction to perform processing tasks associated with the wake-up signal.

19. The processor of claim 18, wherein the power control logic includes instruction decode logic to detect the sleep instruction.

20. The processor of claim 18, wherein the processing unit and the power control logic are utilized as part of a media access control (MAC) layer for the wireless communication device.

* * * * *